235-332 SR

XR 4,045,778

United Stat [redacted]

Atkins et al. [redacted]

[11] 4,045,778

[45] Aug. 30, 1977

[54] DUAL CHANNEL WIDE-BAND FREQUENCY MODULATED KEYABLE CONTROL CIRCUIT AND KEYING CIRCUIT THEREFOR

[75] Inventors: Carl E. Atkins, Montclair; Francis A. McGuirk, Jr., Chatham, both of N.J.

[73] Assignee: Wagner Electric Corporation, Parsippany, N.J.

[21] Appl. No.: 660,116

[22] Filed: Feb. 23, 1976

[51] Int. Cl.[2] ........................ H04Q 9/10; G08B 21/00

[52] U.S. Cl. .............................. 340/171 PF; 307/351; 331/117 R; 340/258 C

[58] Field of Search ......... 340/171 R, 152 T, 171 PF, 340/258 C

[56] References Cited

U.S. PATENT DOCUMENTS

| | | | |
|---|---|---|---|
| 3,671,721 | 6/1972 | Hunn et al. | 340/258 C X |
| 3,816,708 | 6/1974 | Walton | 340/152 T X |
| 3,842,246 | 10/1974 | Kohler | 340/152 T X |
| 3,868,669 | 2/1975 | Minasy | 340/258 C X |
| 3,958,105 | 5/1976 | Sidlauskas | 340/152 T X |

*Primary Examiner*—Donald J. Yusko

*Attorney, Agent, or Firm*—Eyre, Mann, Lucas & Just

[57] ABSTRACT

A keyable control circuit, has sensing coils located in the vicinity of a plurality of locations where lock control is desired. At least one swept high-frequency oscillator, which is connected to each sensing coil, generates an rf signal, rapidly swept over a wide frequency band. When an external keying circuit, containing more than one resonant circuit, each correctly tuned to a predetermined keying frequency, is inductively coupled to a sensing coil, each resonant circuit absorbs rf energy as the oscillator frequency is swept past its resonant frequency. Energy absorption in the external keying circuit induces corresponding reductions in rf energy in the sensing coil as the oscillator frequency is swept past the keying frequencies. Tuned detectors within the keyable control circuit produce a control signal when energy reduction is sensed at each of the predetermined keying frequencies. If correct absorption fails to occur at any one or more of the predetermined frequencies, the control signal is withheld.

A time-gating system enables selective direction of the control signal to one or more using locations while excluding others. This function finds convenient application in automotive use where it is frequently desired to enable simultaneous unlocking of one or more doors while excluding unlocking of the deck lid.

A dead-oscillator detector averts attempted actuation of the unlocking function by the coupling of untuned energy-absorbing material, such as iron, to a sensing coil.

12 Claims, 2 Drawing Figures

DUAL CHANNEL WIDE-BAND FREQUENCY MODULATED KEYABLE CONTROL CIRCUIT AND KEYING CIRCUIT THEREFOR

BACKGROUND OF THE INVENTION

A number of patents disclose single-channel keyable control circuits. For example circuits disclosed in U.S. Pat. Nos. 3,624,415 and 3,628,099, both in the names of Carl E. Atkins and Arthur A. Cake, show keying circuits which require that the correct value of resistance in an external keying circuit be connected to actuate a keyable control circuit. In U.S. Pat. No. 3,723,967 in the names of Carl E. Atkins and Paul A. Carlson, a single channel inductively coupled tuned keying circuit absorbs energy from the radio frequency tank circuit of a free-running oscillator operating at the frequency to which the keying circuit is tuned. Radio frequency detection circuits detect the reduction in energy remaining in the oscillator and thereupon produce a control signal.

In U.S. Pat. No. 3,842,324 an external keying circuit includes a diode having a sharply variable junction capacitance with changes in diode bias as a component in a tuned circuit. When coupled to a keyable control circuit operating in the correct frequency range, absorbed rf energy causes rapid cyclic fluctuations in diode bias. The resulting rapid fluctuations in keying circuit resonant frequency alternately bring the keying circuit into and out of resonance with the rf frequency being generated. When in resonance, the keying circuit absorbs more rf energy from the rf oscillator than when out of resonance. The resulting amplitude modulation in the rf oscillator is detected to provide a control output signal.

Single-frequency keyable control systems suffer from the fact that a simple detection device discloses to a tamperer the frequency at which he must operate to actuate the unlocking mechanism. In fact, a tuneable absorption wavemeter, which is the simplest type of frequency measuring device would itself activate the pure adsorption unlocking mechanism in U.S. Pat. No. 3,723,967. A frequency system, operating at two or more frequencies simultaneously or in sequence, although increasing the difficulty, similarly suffers from the ability of a tamperer to detect the operating frequencies.

SUMMARY OF THE INVENTION

The instant invention uses two or more swept rf oscillators gated into operation one at a time. One of the swept rf oscillators provides excitation signals to one or more sensing coils located at one type of load. Other swept rf oscillators provide excitation signals to other sensing coils for other types of loads. All of the swept oscillators receive a cyclically varying sweep voltage from a single sweep generator.

When a keying circuit, containing two or more resonant circuits tuned to specific keying frequencies within the oscillator sweep range, is coupled to one of the sensing coils, detection circuits within the keyable control circuit detect the depletion of rf energy from the oscillator at these specific keying frequencies. When rf energy depletion is simultaneously detected at all keying frequencies, an output circuit generates a control output signal. The absence of rf absorption at any one specific keying frequency is sufficient to cause the control output signal to be withheld.

Iron absorbs rf energy strongly and approximately equally over a wide frequency range. A piece of iron coupled to a sensing coil could thus significantly reduce the rf energy at all of the specific keying frequencies. A dead-oscillator detector averts spurious generation of a control output signal due to broad-band energy absorption or a dead oscillator. The dead-oscillator detector requires that significant rf energy be present at some frequencies within the rf sweep range before it will enable the control output signal to be generated.

BREIF DESCRIPTION OF THE DRAWINGS

FIG. 1 shows a block diagram of one embodiment of the present invention.

FIG. 2 contains a schemtic diagram of the embodiment shown in FIG. 1.

DETAILED DESCRIPTION OF THE PREFERRED EMBODIMENT

Figure 1:
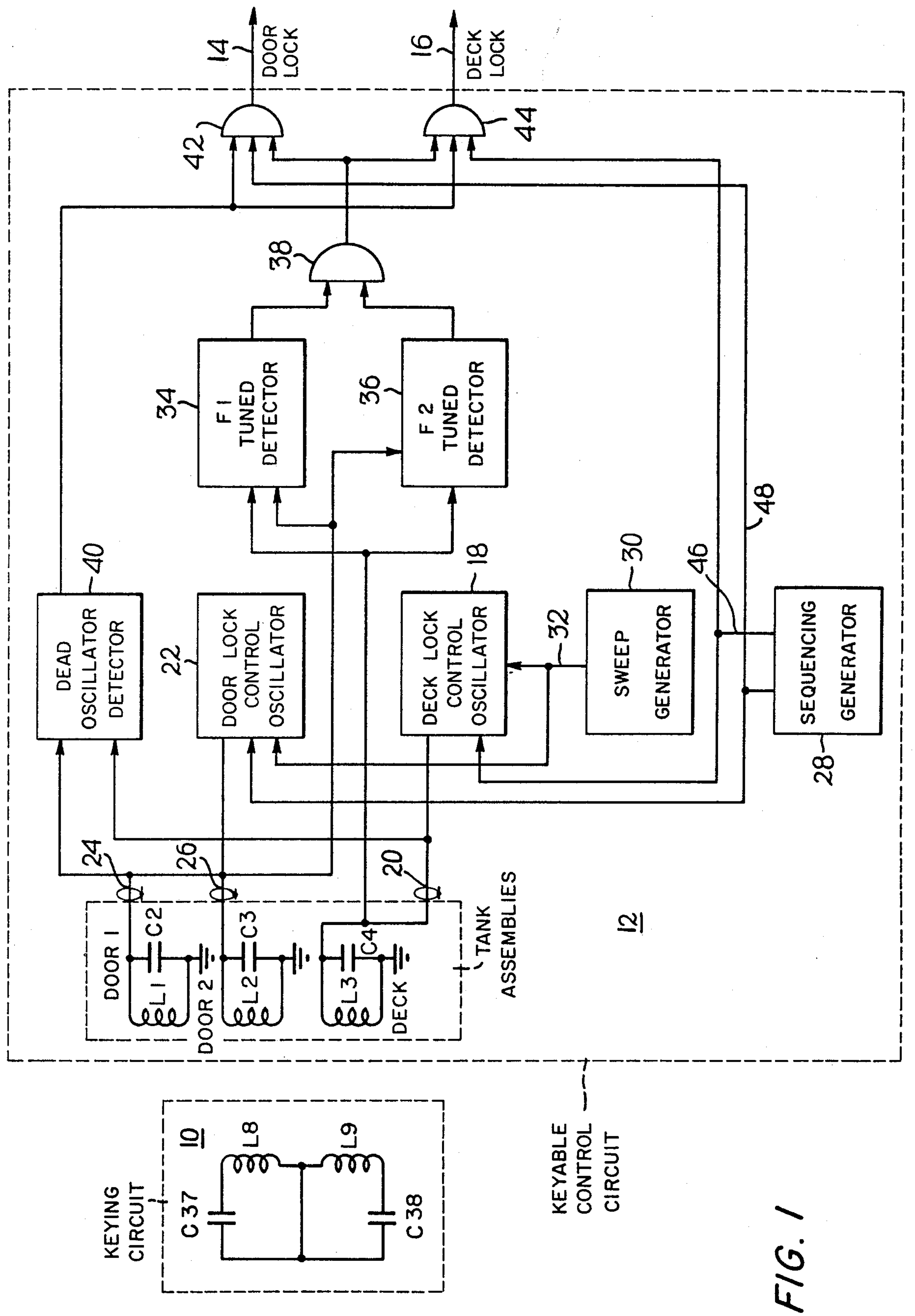

Referring to the block diagram shown in FIG. 1, when a correct keying circuit, shown generally at 10, is brought into inductive coupling with one of the sensing coils L1, L2 or L3 of a keyable control circuit, shown generally at 12, the keyable control circuit 12 generates one or more lock control output signals 14, 16.

A swept deck lock control oscillator 18 feeds rf energy to its oscillator tank circuit composed of deck sensing coil L3 and capacitor C4. The deck oscillator tank circuit L3, C4 is located at the sensing location. A shielded cable 20 connects rf energy from the deck lock control oscillator 18 to the deck tank circuit L3, C4. The capacitance and inductance of the shielded cable 20 as well as stray coupling between the deck sensing coil L3 and nearby objects combine with the circuit values of L3 and C4 to determine the deck lock control oscillator 18 frequency.

A similar swept door lock control oscillator 22 feeds rf energy in parallel to first and second door tank circuits L1, C2 and L2, C3 located adjacent to first and second vehicle doors respectively. As in the deck arrangement previously described, the impedance of the shielded cables 24, 26 from the sensing locations to the oscillator 22 plus stray coupling combine to determine the door lock control oscillator 22 frequency.

A sequencing generator 28 alternately gates the two oscillators 18, 22 into operation. The sequencing generator 28 also performs output gating as will be explained later.

A sweep generator 30 provides a sweep voltage signal 32 in parallel to the swept oscillators 18, 22. The sweep voltage is preferably of triangular or sawtooth waveform but could be of sinusoidal or other waveform. The applied sweep voltage signal 32 causes the frequency of whichever oscillator is gated on at any instant to vary in step with the sweep voltage signal 32. The frequency sweep is very wide compared to the mean oscillator frequency. For example, and not as a limitation, a frequency sweep from 6 to 7 megahertz has been found feasible with the practical circuit component specified later.

A first detector 34 tuned to a first frequency F1 receives inputs from all tank circuits. A similar second detector 36 tuned to a second frequency F2 also receives inputs from all tank circuits.

For the purpose of the discussion which follows, assume that the sequencing generator 28 has enabled the deck lock control oscillator 18. The events leading to the generation of the deck lock control signal 16 will be described. Since operation of the door lock control oscillator 22 is essentially similar, its operation will not be described in detail.

The deck lock control oscillator 18 provides a widely swept frequency signal to the deck sensing coil L3 resonated by parallel capacitor C4. A sample of the rf energy in the deck lock control oscillator 18 is connected in parallel to first detector 34 and second detector 36.

The keying circuit 10 consists of two LC tuned circuits integrated into a single electrical and mechanical assembly. A first LC tuned circuit in the keying circuit 10, comprised of inductor L8 and capacitor C37, is resonant at a different frequency from a second LC tuned circuit comprised of inductor L9 and capacitor C38. Both LC tuned circuits are resonant of frequencies within the sweep range of the deck lock control oscillator 18. Whenever the rf frequency is swept past the resonant frequency of one of the tuned circuits in the keying circuit 10, the tuned circuit absorbs a greater amount of rf energy than at other times. If the frequency at which this increased absorption occurs coincides with the frequency to which either tuned detectors 34 or 36 is tuned, the respective tuned detector 34 or 36 enables one input of coincidence gate 38. If the resonant frequency of the second tuned circuit in the keying circuit 10 coincides with the frequency to which the second tuned detector 34, 36 is tuned, the respective tuned detector 34 or 36 enables the second input to coincidence gate 38. Both inputs to coincidence gate 38 being enabled by the presence of correctly tuned keying circuit 10, the coincidence gate 38 connects an enable signal in parallel to one input of each of the two output gates 42, 44.

A dead oscillator detector 40 receives samples of the rf energy from both oscillators 18, 22. If an oscillator is dead, or if its energy is substantially absorbed over the entire sweep frequency range by an absorbent material such as iron, the dead oscillator detector 40 provides an inhibit signal to one input of each of the two output gates 42, 44. If the deck lock control oscillator 18, which is the oscillator gated on in this discussion, contains substantially full rf energy except at a few resonant absorption points, the dead oscillator detector 40 provides an enable signal to one input of the two output gates 42, 44.

The third input to output gate 44 is enabled at this time by the signal from the sequencing generator 28 which enables the deck lock control oscillator 18. For example, when the deck enable signal 46 is connected to deck lock control oscillator 18, it is also connected to the third input of deck output gate 44. The deck output gate 44 produces a deck unlock signal 16 for connection to an electrically operated deck lock (not shown). At this time, the door output gate 42 is inhibited by the alternative output of the sequencing generator 28. Thus, lock control at this time is restricted to the deck unlock signal 16.

The preceding completes the single-channel functional description of the deck-lock-control portion of the system. The following paragraph outlines the differences in the door-lock-control portion of the system.

At the next alternation of the sequencing generator 28 output, the deck signal 46 is replaced by an inhibit signal and a door enable signal 48 is connected to the door lock control oscillator 22 and to the door output gate 42. The first door control tank circuit L1-C2 is located in the vicinity of one door; a second door control tank circuit L2-C3 is located in the vicinity of a second door. Both door control tank circuits are fed swept rf energy in parallel by the deck lock control oscillator 18. When a correct keying circuit 10 is coupled to either door control tank circuit L1-C2 or L2-C3, radio frequency energy is absorbed at two keying frequencies as previously described. The first and second detectors 34 and 36 detect the energy depletion at the keying frequencies, enable door output gate 42, and produce a door lock control output 14 in a manner analogous to the production of the deck unlock output 16 previously described.

Figure 2:
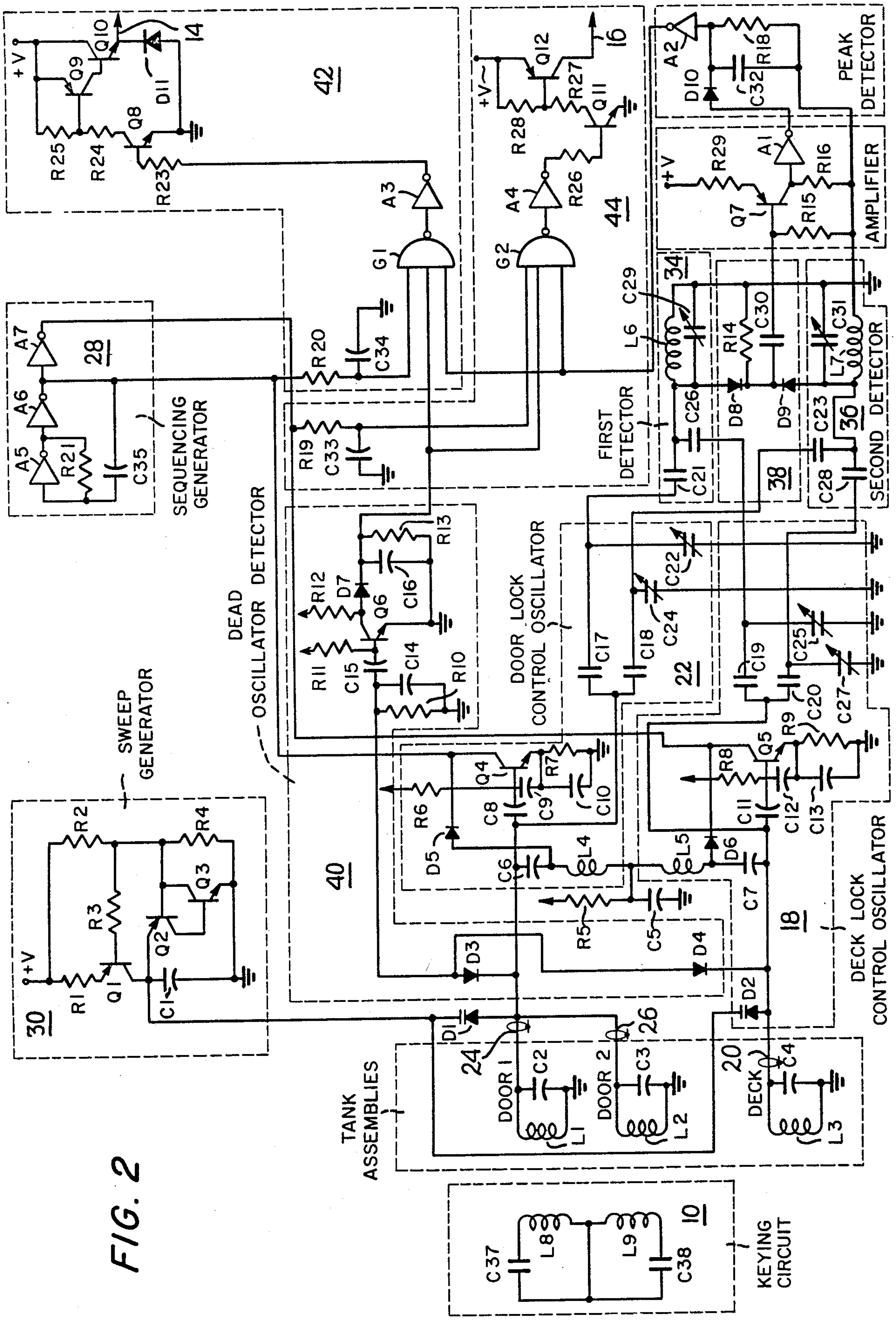

Detailed functioning of the system is described with reference to the schematic diagram shown in FIG. 2. Each function previously identified is boxed and identically numbered in this drawing. The deck lock control oscillator 18, with its associated circuits is identical to the door lock control oscillator 22 with its associated circuits. Consequently, only the operation of the deck lock control circuits will be described in detail. Functional differences between the two control circuits will be described at the end of the detailed single-channel description.

The deck lock control oscillator 18 is an oscillator made up of transistor Q5 and associated components. A capacitive divider made up of capacitors C12 and C13 provide positive feedback from emitter to base of Q5 to sustain oscillation.

When the positive gating voltage from the sequencing generator 28 appears at the collector of Q5, a ground inhibit signal is simultaneously connected to the collector of Q4 in the door lock control oscillator 22. Current through R5 and L4 flows through forward-biased rf bypass diode D5 in the door lock control oscillator 22. Forward biases diode D5 provides a short-circuit path to ground for rf energy from the door oscillator tank circuits through bypass capacitor C6. This rf bypass effectively places an rf ground at the junction of varactor diode D1 and the two door tank circuits L1, C2 and L2, C3. This rf bypass prevents the door tank circuits from interacting with the deck lock control oscillator 18 during its operation. The positive gating voltage at the collector of Q5 back-biases rf bypass diode D6 in the deck lock control oscillator 18. With rf bypass diode D6 back biased, bypass capacitor C7 is ineffective to shunt rf energy to ground. Rf choke L5 isolates the rf in Q5 from the bias voltage source. Thus Q5 is enabled to generate rf energy.

The sequencing generator 28 is made up of amplifiers A5, A6 and A7 with frequency-determining feedback components R21 and C35. The output of amplifier A6 is a square wave alternating between zero volts and positive voltage. The output of amplifier A6 is connected to door output gate 42 and to door lock control oscillator 22. Inverter amplifier A7, also receiving the output of amplifier A6, provides an output which is the inverse of its input. For example, when the output of amplifier A6 is zero volts, the output of inverter amplifier A7 is positive, and vice versa. The output of inverter amplifier A7 is connected to deck output gate 44 and to deck lock control oscillator 18. It will be evident that, whenever the deck lock control oscillator 18 and its associated deck output gate 44 are enabled by the positive output of inverter A7, the zero output of amplifier A6 must inhibit both door lock control oscillator 22 and its associated door output gate 42.

The positive voltage at the collector of oscillator transistor Q5 back biases diode D6 thus removing the ac short circuit between base and collector of Q5 through C7 and previously conducting diode D6. Oscillator transistor Q5 begins generating rf energy at a frequency determined by its tank circuit L3, C4, cable 20 impedance, stray capacitance, and the sweep voltage across varactor diode D2 generated by sweep generator 30.

The sweep generator consists of an integrating capacitor C1, a charging current source transistor Q1 and a switch Q2, Q3. Assume initially that switch transistors Q2 and Q3 are turned off and integrating capacitor C1 is discharged. The voltage divider consisting of resistors R2 and R4 holds the base of switch transistor Q2 at approximately 2.5 volts. The emitter of Q2 is initially at zero volts due to the discharged condition of C1. The emitter-base junction of Q2 is consequently held in the back-biased condition as long as its base voltage remains more positive than its emitter voltage.

Integrating capacitor C1 begins to charge from the positive supply through limiting resistor R1 and the emitter-collector junction of current supply transistor Q1. The approximately linear voltage increase in integrating capacitor C1 is connected in parallel to sweep varactor diodes D1 and D2 in the tank circuits of door lock control oscillator 22 and deck lock control oscillator 18, respectively. When the voltage across the integrating capacitor reaches 3.15 volts (2.5 volts bias + 0.65 volt base-emitter drop), transistor Q2 is turned on. The positive voltage now appearing at the base of transistor Q3 causes Q3 to also turn on. The current in the emitter-collector path of Q3 increases the voltage drop across resistor R2 to approximately 7.35 volts. This voltage drop holds the base of Q2 at 0.65 volts as long as current continues to flow in Q3. Integrating capacitor C1 is rapidly discharged through the emitter-collector junction of Q2 and the base-emitter junction of Q3. As soon as the charge in integrating capacitor C1 is depleted to approximately zero volts, the emitter of Q2 no longer being more positive than its base causes Q2 to turn off. This, in turn, removes the control voltage from the base of Q3. Q3 consequently turns off. The current through Q3 now being terminated cause the junction of voltage divider R2 and R4 to again rise to 2.5 volts. The charging of integrating capacitor C1 resumes. This continuing pattern of approximately linear charge followed by relatively instantaneous discharge produces a sawtooth waveform which is used to sweep the oscillator 18 or 22 frequency.

Varactor diode D2 is connected in series to ground with integrating capacitor C1. The varactor/integrator combination, D1/C1, is connected in parallel with the deck tank circuit L3, C4. Changes in the junction capacitance of varactor diode D2 are therefore effective to vary the frequency of the deck lock control oscillator 18.

A sample of the rf energy in the deck lock control oscillator 18, taken at the junction of capacitors C7 and C11, is connected to a first capacitive voltage divide consisting of fixed capacitor C19 and variable capacitor C25, and to a second capacitive voltage divider consisting of fixed capacitor C20 and variable capacitor C27. The two capacitive voltage dividers are adjusted after installation to compensate for the fact that the amplitude of the rf energy generated by Q5 varies across the sweep frequency range. Typically, rf energy is lower at the low-frequency end of the sweep. When correctly adjusted, the ac signal coupled to first detector 34 at frequency F1 equals the ac signal coupled to second detector 38 at frequency F2. In addition, adjustment of the capacitive voltage dividers from deck lock control oscillator 18 plus a corresponding pair of capacitive voltage dividers C18, C24 and C17, C2 from door lock control oscillator 22 compensate for rf energy differences between the two oscillators.

Within first detector 34, capacitor C26 couples the rf energy from the junction of capacitive voltage divider C19, C25 to a sharply parallel-resonant circuit comprised of inductor L6 and capacitor C29. This resonant circuit is tuned to the first keying frequency. In the absence of a keying circuit 10, each time the oscillator frequency is swept past the first keying frequency, the rf voltage across L6 and C29 is increased by the Q of the resonant circuit. An rf voltage spike is thus generated each time the frequency is swept past the first keying frequency. This rf voltage spike is detected by diode D8 which connects the envelope of the rf spike to the base of amplifier transistor Q7. The positive base voltage turns off transistor Q7. The resulting low input to inverter amplifier A1 causes inverter amplifier A1 to generate a sequence of positive output pulses. Diode D10 feeds the positive pulses into peak-detector capacitor C32. The time constant of peak-detector capacitor C32 and bleeder resistor R18 is such that if one rf spike is detected per frequency sweep, peak-detector capacitor C32 remains sufficiently charged to maintain the output of inverter amplifier A2 at approximately zero volts. The resulting zero-volts output of inverter A2 inhibits one input of each of output gates 42 and 44. Thus if only the circuit tuned to the first keying frequency in keying circuit 10 is absent, the result is complete denial of a control output regardless the presence or absence of other tuned circuits in the keying circuit 10.

When a resonant circuit C37, L8 or C38, L9, tuned to the first keying frequency, is inductively coupled to the deck sensing coil L3, the rf energy at the first keying frequency is depleted by absorption in the keying circuit. Thus, as the oscillator frequency is swept past the first keying frequency, the parallel-resonant circuit C29, L6 in the first detector 34 finds insufficient rf energy with which to form an rf spike. Consequently, no energy is stored in peak-detector capacitor C32 as a result of an rf spike at frequency F1.

Second detector 36 operates in the same fashion as just described for first detector 34. If a properly tuned circuit in the keying circuit also absorbs energy at frequency F2, the rf spike otherwise generated by L7 and C31 is suppressed in the same manner as described for the suppression of the F1 spike. With both rf spikes suppressed, peak-detector capacitor C32 discharges through bleeder resistor R18. As soon as the voltage across peak-detector capacitor C32 approaches zero, the output of inverter amplifier A2 switches from zero volts to a positive enable signal. This positive enable signal enables one input of door output gates 42 and deck output gate 44.

A second input to the deck output gate 44 is provided by a signal from dead oscillator detector 40 which is generated as described in the following sentence. A sample of the rf energy in the deck lock control oscillator 18 is rectified in diode D4 and connected as a sequence of negative half cycles through capacitor C15 to the base of transistor Q6. With the values given for capacitor C15 and C14 and resistor R10, transistor Q6 is unable to respond at the rf frequency. If no tuned circuit is coupled to the sensing coil L3, or if deck lock control oscillator 18 is dead, transistor Q6 produces a null output. Capacitor C16, failing to receive charging signals from transistor Q6 remains discharged by bleeder resistor R13. The resulting zero-volt signal inhibits one input of door output gate 42 and deck output gate 44. Thus, if an alternating component in the rf envelope is not produced by the presence of a tuned keying circuit, the output gates 42, 44 remain inhibited. The absence of alternating component in the rf envelope may be due to the absence of a tuned circuit, the nonfunctioning of the oscillator, or to the presence of an absorber, such as iron which absorbs the rf energy at all frequencies.

If any resonant circuit, tuned within the sweep range of the functioning deck lock control oscillator 18 is coupled to the sensing coil (whether or not the resonant frequency matches frequency F1 or F2), the resulting amplitude-modulated component in the rf envelope causes transistor Q6, normally turned on, to be turned off momentarily each time the oscillator frequency sweeps past the frequency of the external resonant circuit. The resulting positive alternations in the output of transistor Q6 are connected through diode D7 to capacitor C16. Capacitor C16 becomes charged to approximately the peak of the positive-going signal at the collector of transistor Q6. The resistance of bleeder resistor R13 is so high that, as long as positive charging signals occur at the sweep rate, it does not significantly deplete the charge in capacitor C16. The positive voltage stored in C16 provides the enable signal which enables the second input to deck output gate 44.

The third input to deck output gate 44 is enabled, as previously described, by the high output assumed at this time from inverter A7 in the sequencing generator 28. A leading-edge delay circuit composed of resistor R19 and capacitor C33 on the input to deck output gate 44 applies a few milliseconds delay to the onset of the gating signal from sequencing generator 28 to ensure that the peak-detector capacitor C32 is given time to charge following the end of the preceding door cycle. Without the slight delay imposed in this way, if a door control signal is properly generated in the preceding time period, the initiation of the deck control time period finds capacitor C32 fully discharged. Since it takes a few frequency sweeps to fully charge capacitor C32, an immediate application of the sequence generator 28 signal to the deck output gate 44 would produce an undesired unlock signal. The delay imposed by the leading-edge delay circuit R19, C33 avoids such undesired unlock signals.

When all inputs to NAND gate G2 in deck output gate 44 are enabled, the resulting low output is amplified and inverted in inverter A4 and connected through R26 to the base of output control transistor Q11. Output control transistor Q11 is turned on by the positive voltage at its base. The resulting reduced voltage at the base of output transistor Q12 turns output transistor Q12 on. The emitter-collector junction of output transistor Q12 provides a positive control output signal 16 for operation of the deck lock (not shown).

The preceding completes the detailed single-channel description of the deck lock control portion of the system. The following paragraphs detail the differences to be found in the operation of the door lock control portion of the system. Description of those functions which are the same in the two portions of the system is omitted.

At the end of the deck control time period, the outputs of the sequencing generator 28 are reversed. The positive enable signal, previously connected from inverter A7 in the sequencing generator 28 to transistor A5, is replaced by a ground signal. The ground signal previously connected from amplifier A6 in the sequencing generator 28 to transistor Q4, is replaced by a positive enable signal. The ground signal at the collector of Q5 turns off the deck lock control oscillator 18 and causes rf bypass diode D6 to become forward biased. Forward-biased diode D6 acts as an rf short from the deck tank circuit L3, C4 through bypass capacitor C7 to ground. This rf bypass path eliminates interaction between the deck control tank circuit L3, C4 and the active door lock control channel.

The door lock control channel contains two tank circuits L1, C2 and L2, C3 which are fed rf energy in parallel rather than the single tank circuit L3, C4 as described for the deck lock control channel. Although circuit values are adjusted slightly to ensure that the full frequency sweep is attainable, the operation of the front end of the door lock control channel is otherwise identical to the deck lock control channel.

The door output gate 42 is similar to the deck output gate 44 except for the substitution of a darlington output amplifier, Q9, Q10, in place of the single-transistor output amplifier Q12 used in the deck output gate 44. The higher gain obtainable with the darlington output amplifier Q9, Q10 is necessary to produce a door lock control signal 14 capable of simultaneously operating the locks on both doors instead of the single-lock operation required by the deck lock control channel.

The following list of circuit component values and identities are illustrative of one practical embodiment of the invention. It will be readily evident to one skilled in the art that different component values or arrangements will produce equivalently functioning systems without departing from the teachings of the invention.

| Resistances (ohms) | | Capacitances (microfarads) | | Transistors | |
|---|---|---|---|---|---|
| R1 | 22K | C1 | .01 | Q1 | 2N4248 |
| R2 | 22K | C2 | 20–500 pf (shielded cable capacitance) | Q2 | 2N4248 |
| R3 | 1M | C3 | " | Q3 | 2N5132 |
| R4 | 10K | C4 | " | Q4 | 2N5132 |
| R5 | 33K | C5 | .01 | Q5 | 2N5132 |
| R6 | 1.5M | C6 | .01 | Q6 | 2N5132 |
| R7 | 10K | C7 | .01 | Q7 | 2N4248 |
| R8 | 1.5M | C8 | 200pf | Q8 | 2N3567 |
| R9 | 10K | C9 | 200pf | Q9 | MJE371 |
| R10 | 470K | C10 | .2pf | Q10 | 2N3055 |
| R11 | 3.3M | C11 | .2pf | Q11 | 2N3567 |
| R12 | 220K | C12 | .2pf | Q12 | MJE371 |
| R13 | 10M | C13 | .2pf | | |
| R14 | 270K | C14 | .001 | Integrated Circuits | |
| R15 | 10M | C15 | 470pf | A1 | CD4009AE |
| R16 | 470K | C16 | .027 | A2 | CD4009AE |
| R17 | 10K | C17 | 15pf | A3 | CD4009AE |
| R18 | 1.5M | C18 | 15pf | A4 | CD4009AE |
| R19 | 1M | C19 | 15pf | A5 | CD4009AE |
| R20 | 1M | C20 | 15pf | A6 | CD4009AE |
| R21 | 1.5M | C21 | 10pf | A7 | CD4023AE |
| R23 | 10K | C22 | 5–30 pf var | Gates | |
| R24 | 470 | C23 | 10pf | G1 | CD4023AE |
| R25 | 10K | C24 | 5–30pf var | G2 | CD4023AE |
| R26 | 10K | C25 | 5–30pf var | Diodes | |
| R27 | 470 | C26 | 10pf | D1 | MV1401 |
| R28 | 10K | C27 | 5–30pf var | D2 | MV1401 |
| R29 | 10K | C28 | 10pf | D3 | IN4148 |
| | | C29 | 10–180pf var | D4 | IN4148 |
| | | C30 | .0047 | D5 | IN4148 |
| | | C31 | 10–180pf var | D6 | IN4148 |
| | | C32 | .068 | D7 | IN4148 |
| | | C33 | .01 | D8 | IN4148 |

-continued

| | | | | | |
|---|---|---|---|---|---|
| | | C34 | .01 | D9 | IN4148 |
| | | C35 | .22 | D10 | IN4148 |
| | | C36 | not used | D11 | IN5060 |
| | | C37 | 56pf | | |
| | | C38 | 50pf | | |
| Inductances (microhenry) | | | | | |
| L1 | 39 | | | | |
| L2 | 39 | | | | |
| L3 | 39 | | | | |
| L4 | 1500 | | | | |
| L5 | 39 | | | | |
| L6 | 5 | | | | |
| L7 | 5 | | | | |
| L8 | 10.5 | | | | |
| L9 | 10.5 | | | | |

It will be understood that the claims are intended to cover all changes and modifications of the preferred embodiments of the invention, herein chosen for the purpose of illustration which do not constitute departures from the spirit and scope of the invention.

What is claimed is:

1. A keyable control circuit for use with a keying circuit having at least one resonant frequency comprising:

a. at least one oscillator;

b. means for connecting energy from said at least one oscillator to at least first and second spaced locations;

c. means for generating a first signal when a keying circuit having said at least one resonant frequency is coupled to any one of said at least first or second spaced locations;

d. means for generating a second signal when said first signal results from said keying circuit having at least one resonant frequency being coupled to said first location; and e. means for generating a third signal when said first signal results from said keying circuit having said at least one resonant frequency being coupled to said second location.

2. A keyable control circuit as recited in claim 1 comprising:

a. said at least one resonant frequency being at least two resonant frequencies;

b. means for generating a fourth signal when said keying circuit coupled to either said first or second locations has at least a second of said at least two resonant frequencies;

c. said means for generating a second signal being operative when a keying circuit having said at least first and second resonant frequencies is coupled to said first location; and d. said means for generating a third signal being operative when a keying circuit having said at least first and second resonant frequencies is coupled to said at least second location.

3. A keyable control circuit as recited in claim 2 further comprising:

a. said at least one oscillator being at least a first and a second oscillators;

b. the output of said first oscillator being connected to at least said first spaced location;

c. the output of said second oscillator being connected to at least said second spaced location;

d. said first oscillator being operative to oscillate at said first of at least two resonant frequencies; and e. said second oscillator being operative to oscillate at said second of at least two resonant frequencies.

4. The keyable control circuit and keying circuit therefor as recited in claim 2, wherein said first and fourth signal generation means comprises:

a. first and second tuned circuits wherein said first tuned circuit is resonant at said at least first resonant frequency and said second tuned circuit is resonant at said at least second resonant frequency;

b. means for inductively coupling said first and second tuned circuits to said keyable control circuit;

c. a first detector, operative in the absence of said first tuned circuit to inhibit the generation of a control output; and d. a second detector, operative in the absence of said second tuned circuit to inhibit the generation of a control output.

5. The keyable control circuit and keying circuit therefor, as recited in claim 2, further comprising an AND gate receiving said first and fourth signals at its input and operative to generate said control output only when both said first and fourth signals are simultaneously present.

6. A keyable control circuit and keying circuit therefor as recited in claim 2 wherein said first and fourth signal generating means further comprises:

a. a sensing coil receiving a sample of the energy from said oscillator, said sensing coil being disposed in a location where inductive coupling thereto by external circuits is enabled;

b. keying circuit means containing at least first and second tuned circuits being resonant at said at least two resonant frequencies;

c. a first resonant detector operative to generate a first voltage spike each time energy fed into it at said first resonant frequency exceeds a predetermined threshold, said threshold being above the level remaining when a keying circuit containing a tuned circuit resonant at said first resonant frequency is connected to said sensing coil;

d. at least a second resonant detector operative to generate a second voltage spike each time energy fed into it at at least said second resonant frequency exceeds a predetermined threshold, said threshold being above the level remaining when a keying circuit containing a tuned circuit resonant at said second resonant frequency is connected to said sensing coil; and e. means generating a control output only upon absence of said first and second voltage spikes.

7. A keyable control circuit and keying circuit therefor as recited in claim 10 wherein said means for connecting is an electrically operated switch comprising:

a. an rf bypass capacitor connected at its first end to said oscillator;

b. a diode connected at its first end to the second end of said bypass capacitor;

c. a current source connected through an rf choke to the junction of said bypass capacitor and diode; and d. means for selectively causing said diode to become conducting or non-conducting.

8. A keyable control circuit as recited in claim 1 wherein at least one of said at least first and second spaced locations comprises at least two spaced locations.

9. The keyable control circuit and keying circuit therefor recited in claim 1 further comprising:

a. means for sweeping said at least one oscillator between first and second frequencies; and b. said first and second frequencies spanning said at least one resonant frequency.

10. The keyable control circuit and keying circuit therefor as recited in claim 9, wherein said means for sweeping comprises:

a. a varactor diode having a junction capacitance which varies with the bias voltage applied across it;

b. means for connecting said varactor diode to the frequency-determining elements of said oscillator in such a manner that at least part of the junction capacitance of said varactor diode is effective to determine the frequency of said oscillator; and c. means for cyclically varying the bias across said varactor diode.

11. A keyable control circuit and keying circuit therefor comprising:

a. a plurality of oscillators;

b. means for cyclically sweeping the frequency of said plurality of oscillators;

c. a first sensing coil receiving swept energy from a first of said plurality of oscillators;

d. at least a second sensing coil receiving swept energy from at least second of said plurality of oscillators;

e. means for cyclically enabling each of said first and second oscillators into operation;

f. keying circuit means for generating first and second signals each time the frequency of said first oscillator is swept past first and second frequency regions;

g. first output means operative in responsive to gating on of said first oscillator and the simultaneous presence of said first and second signals to generate a first control output signal, said first output means being adapted to prevent generation of said first control output in the absence of one or more of the following:

i. oscillation in said first oscillator, ii. said first signal, and iii. said second signal; and h. at least a second output means operative in response to gating on of said second oscillator and the simultaneous presence of said first and second signals to generate a second control output signal, said second output means being adapted to prevent generation of said second control output in the absence of one or more of the following:

i. oscillation in said second oscillator ii. said first signal, and iii. said second signal.

12. A method of keyably controlling an electrical circuit using a keying circuit having at least one resonant frequency comprising:

a. generating oscillations;

b. connecting energy from said oscillations to at least first and second spaced locations;

c. generating a first signal when a keying circuit having said at least one resonant frequency is coupled to any one of said at least first and second spaced locations;

d. generating a second signal when said keying circuit is coupled to said first spaced location; and e. generating at least a third signal when said keying circuit is coupled to at least said second spaced location.

* * * * *